(12) United States Patent
Mayer

(10) Patent No.: US 10,456,986 B2
(45) Date of Patent: Oct. 29, 2019

(54) METHOD FOR REINFORCING AND/OR LINING MATERIAL

(71) Applicant: Woodwelding AG, Stansstad (CH)

(72) Inventor: Jörg Mayer, Niederlenz (CH)

(73) Assignee: WOODWELDING AG, Stansstad (CH)

( * ) Notice: Subject to any disclaimer, the term of this patent is extended or adjusted under 35 U.S.C. 154(b) by 517 days.

(21) Appl. No.: 15/103,014

(22) PCT Filed: Dec. 13, 2013

(86) PCT No.: PCT/CH2013/000223
§ 371 (c)(1),
(2) Date: Jun. 9, 2016

(87) PCT Pub. No.: WO2015/085440
PCT Pub. Date: Jun. 18, 2015

(65) Prior Publication Data
US 2016/0311153 A1    Oct. 27, 2016

(51) Int. Cl.
*B29C 65/08* (2006.01)
*B29C 65/14* (2006.01)
(Continued)

(52) U.S. Cl.
CPC ............ *B29C 65/085* (2013.01); *B29C 35/02* (2013.01); *B29C 65/0681* (2013.01);
(Continued)

(58) Field of Classification Search
CPC ... B29C 65/805; B29C 65/0681; B29C 65/08; B29C 65/14; B29C 65/16; B29C 65/568;
(Continued)

(56) References Cited

U.S. PATENT DOCUMENTS 4,794,030 A    12/1988  Celia
5,077,115 A *  12/1991  Arthur ............... C08K 3/36
                                              257/E23.007
(Continued)

FOREIGN PATENT DOCUMENTS

CN    101743120    6/2010
EP    2 202 050    6/2010
(Continued)

OTHER PUBLICATIONS

European Office Action dated Jul. 25, 2018, Application No. 13811768.4, 3 pages.
(Continued)

*Primary Examiner* — Anthony Calandra
*Assistant Examiner* — Jamel M Nelson
(74) *Attorney, Agent, or Firm* — Rankin, Hill & Clark LLP

(57) ABSTRACT

A method of manufacturing a heterogeneous composite includes the steps of providing a first constituent and a second constituent, wherein the first constituent is porous or capable of developing pores when under hydrostatic pressure, and the second constituent comprises a solid having thermoplastic properties; positioning the second constituent relative to the first constituent and coupling energy into the second constituent to cause at least portions of the second constituent to liquefy and to penetrate into pores or other structures of the first constituent, whereby the first constituent is interpenetrated by the second constituent to yield a composite; and, causing an irreversible transition at least of the second constituent to yield a modified composite.

21 Claims, 5 Drawing Sheets

(51) Int. Cl.
*B29C 65/16* (2006.01)
*B29C 65/56* (2006.01)
*B29C 65/00* (2006.01)
*B29C 35/02* (2006.01)
*B29C 65/06* (2006.01)
*B29K 105/16* (2006.01)
*B29K 505/00* (2006.01)
*B29K 507/00* (2006.01)
*B29K 705/00* (2006.01)
*B29K 707/04* (2006.01)

(52) U.S. Cl.
CPC .............. *B29C 65/08* (2013.01); *B29C 65/14* (2013.01); *B29C 65/16* (2013.01); *B29C 65/562* (2013.01); *B29C 66/12441* (2013.01); *B29C 66/30326* (2013.01); *B29C 66/474* (2013.01); *B29C 66/712* (2013.01); *B29C 66/727* (2013.01); *B29C 66/7392* (2013.01); *B29C 66/8322* (2013.01); *B29C 65/06* (2013.01); *B29C 66/71* (2013.01); *B29C 66/72321* (2013.01); *B29C 66/72325* (2013.01); *B29C 66/73365* (2013.01); *B29C 66/7444* (2013.01); *B29C 66/7461* (2013.01); *B29C 66/8122* (2013.01); *B29C 66/9513* (2013.01); *B29C 66/9517* (2013.01); *B29K 2105/16* (2013.01); *B29K 2505/00* (2013.01); *B29K 2507/00* (2013.01); *B29K 2705/00* (2013.01); *B29K 2707/04* (2013.01); *B29K 2995/0027* (2013.01)

(58) Field of Classification Search
CPC .............. B29C 35/02; B29C 66/12441; B29C 66/30326; B29C 66/474; B29C 66/712; B29C 66/727; B29C 66/392; B29C 66/8322; B29C 65/085; B29C 65/562; B29C 65/06; B29C 66/7392
See application file for complete search history.

(56) References Cited

U.S. PATENT DOCUMENTS

| | | | |
|---|---|---|---|
| 5,137,755 A * | 8/1992 | Fujikawa | C04B 35/52 118/47 |
| 5,429,780 A * | 7/1995 | Prin | B01J 27/224 264/43 |
| 6,331,028 B1 | 12/2001 | O'Neill et al. | |
| 2003/0118757 A1* | 6/2003 | Bauer | B29C 43/006 428/34.1 |
| 2005/0126680 A1* | 6/2005 | Aeschlimann | B29C 65/08 156/73.1 |
| 2009/0136809 A1* | 5/2009 | Wang | B82Y 30/00 429/532 |
| 2010/0143145 A1* | 6/2010 | Jones | B29C 63/0021 416/230 |
| 2011/0062617 A1 | 3/2011 | Lehmann et al. | |
| 2012/0321543 A1* | 12/2012 | Miyamoto | B01J 23/745 423/447.1 |

FOREIGN PATENT DOCUMENTS

| | | |
|---|---|---|
| WO | 98/42988 | 10/1998 |
| WO | 00/79137 | 12/2000 |
| WO | 2008/034278 | 3/2008 |
| WO | 2013/185251 | 12/2013 |

OTHER PUBLICATIONS

Bauer, et al., "Microceramic Injection Molding", Advanced Micro and Nanosystems, Microengineering of Metals and Ceramics, vol. 3, Chapter 12, pp. 325-356.

Sanazov, et al., "Criteria of Polymer Carbonization", Russian Journal of Applied Chemistry, 2009, vol. 82, No. 3, pp. 473-482.

* cited by examiner

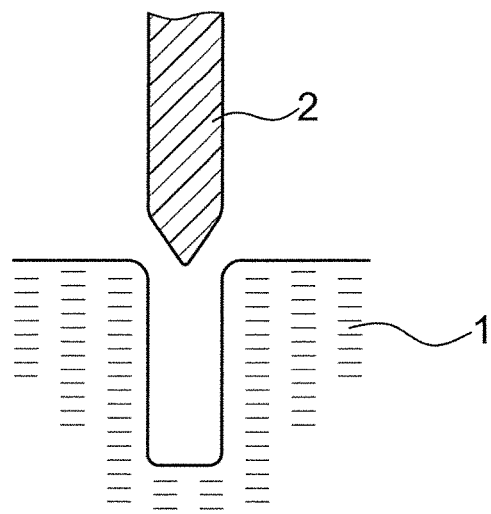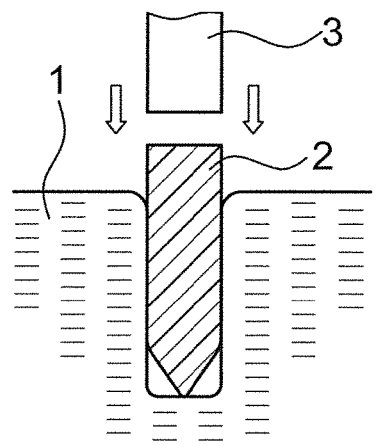
Fig. 1a     Fig. 1b
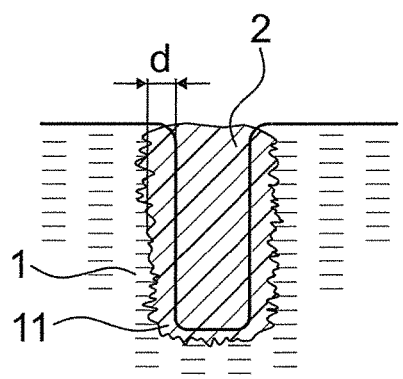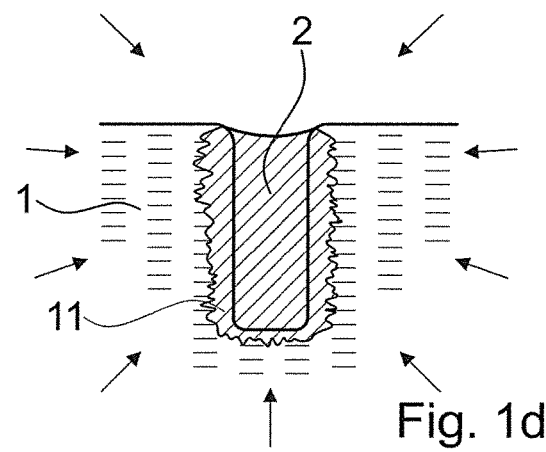
Fig. 1c     Fig. 1d
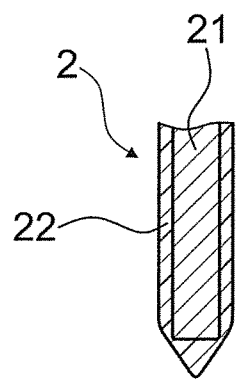
Fig. 2

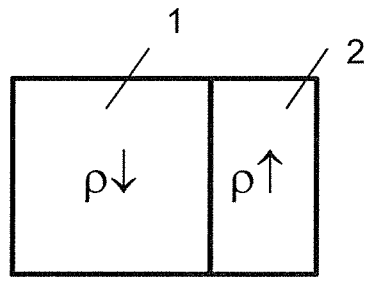
Prior art   Fig. 8a
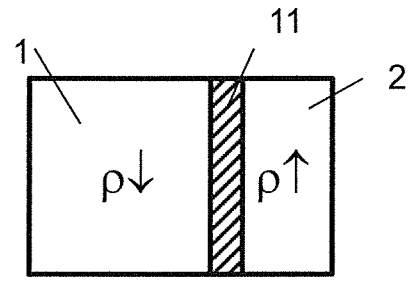
Fig. 9a
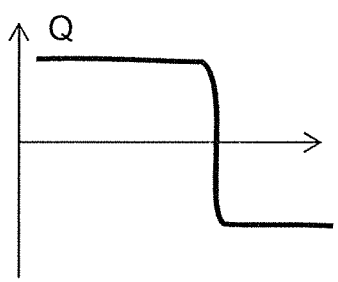
Prior art   Fig. 8b
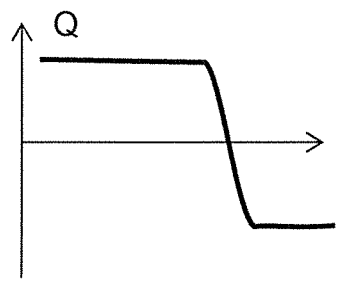
Fig. 9b
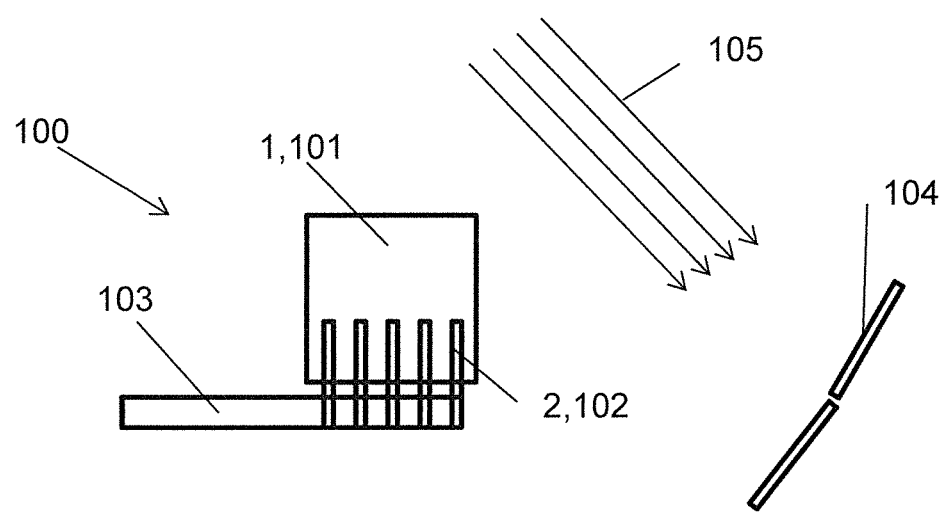
Fig. 10

METHOD FOR REINFORCING AND/OR LINING MATERIAL

BACKGROUND OF THE INVENTION

The invention is in the fields of connection and fixation technology, in particular in energy generation and conversion, chemical engineering and construction materials for all kinds of different industries.

It is often difficult to connect objects of porous material, especially brittle porous material, to other elements, for example for mounting, making an electrically conducting and/or heat conducting connection or other purposes.

SUMMARY OF THE INVENTION

It is an object of the present invention to provide approaches for connecting objects together with connection properties that so far were not achievable.

According to an aspect of the invention, a method of manufacturing a heterogeneous composite is provided, the method includes the steps of:
- of providing a first constituent and a second constituent,
    - wherein the first constituent is (porous or capable of developing pores when under hydrostatic pressure), and the second constituent comprises a solid having thermoplastic properties,
- positioning the second constituent relative to the first constituent and coupling energy into the second constituent to cause at least portions of the second constituent to liquefy and to penetrate into pores or other structures of the first constituent, whereby the first constituent is interpenetrated by the second constituent to yield a composite,
- causing an irreversible transition at least of the second constituent into a modified composite.

The property "being capable of developing pores under hydrostatic pressure" means that when the first constituent is subject to hydrostatic pressure (pressure exerted by a fluid), the flowable material that causes this pressure may penetrate at some locations, whereas at other locations it does not penetrate or penetrates to a lesser extent. The property thus implies an inhomogeneity in terms of mechanical resistance. An example of a material that has this property is a composite of a soft material and a hard material or a heterogeneous material in which the interfacial adhesion between the constituents is smaller than the force exerted by the penetrating flowable material.

In this text, 'pores' refers on the one hand to structures that are a property the material, like the pores on porous materials like foams etc. or inhomogeneities of the mentioned kind, for example of composites of soft and hard materials, etc. On the other hand 'pores' also refers to purposefully made structures like structures manufactured by machining cavities into an element, or to design related empty spaces.

Thus, in general, for the first constituents an inhomogeneity is required, either in terms of structure (porous, this includes manufactured structures and geometrical design) or in terms of material composition.

A material having thermoplastic properties is a material that has a polymeric phase (especially C, P, S or Si chain based) that transforms from solid into liquid above a critical temperature range, for example by melting, and re-transforms into a solid material below the critical temperature range, for example by crystallization, whereby the viscosity of the solid phase is several orders of magnitude (at least three orders of magnitude) higher than of the liquid phase. Materials having thermoplastic properties are not restricted to macromolecules in the narrow sense of the word but for example include waxes. The material having thermoplastic properties may but need not exhibit viscoelastic properties.

The thermoplastic material generally will include a polymeric component that is not cross-linked covalently or cross-linked in a manner that the cross-linking bonds open reversibly upon heating above a critical temperature.

The irreversible transition is a transition in which chemical properties of the corresponding material—especially a matrix material of the second constituent—are fundamentally changed on a molecular level. Put differently, the irreversible transition may include a chemical transition.

In embodiments, the irreversible transition at least of the second constituent is caused by an energy input on the composite. This may, for example, include a heat treatment. For example, the irreversible transition may be caused by heating the composite after the interpenetration, for example to temperatures above 350°, above 500° C., or even above 600° C.

In addition or as an alternative, the energy input on the composite may comprise irradiation.

If the second constituent or a polymeric component thereof (such as the polymeric matrix material belonging to the second constituent) is based on carbon chains, then in a first group (oxidizing atmosphere) the irreversible transition may include a decomposition (pyrolysis and/or oxidation; 'burning') of this component at least to a certain extent. In a second group (absence/shortage of Oxygen; reducing atmosphere), the irreversible transition may include a carbonization or graphitization of the component. In both groups, the irreversible transition may include, in addition or as an alternative, a transition of Carbon atoms or carbon-containing molecules into atomic solution of another component of the second constituent or especially material of the first constituent. Thereafter, depending on the materials of the constituents, optionally a further treatment such as a firing step may be carried out in which a powder phase is transferred into a solid phase by a sintering process.

If the second constituent or a polymeric component thereof (such as the polymeric matrix material belonging to the second constituent) is a polymeric silicate, then the transition may include the transition into a mineral, polymerized silicon oxide.

The polymeric component may additionally or alternatively also include a polyphosphate, a polysulfide, or other inorganic polymers.

In a group of embodiments, the irreversible transition causes the interpenetrated material of the second constituent to lose its thermoplastic property.

In addition or as an alternative to the energy input, the irreversible transition may be caused by other deliberate changes of environmental conditions, for example exposure to a substance etc.

In addition or as yet another alternative, energy that causes the irreversible transition may be released by a chemical reaction taking place within or between the constituents themselves.

Additionally or as an even further alternative, the irreversible transition is a chemical reaction between the constituents, the chemical reaction being enabled by the intimate contact between the constituents brought about by the interpenetration step.

In accordance with a first possibility, the irreversible transition of the second constituent into a modified composite is caused after interpenetration of the first constituent by the second constituent and after re-solidification of the second constituent.

In accordance with a second possibility, the penetration and the transition are at least partially simultaneous, for example if the irreversible transition is a reaction between the constituents or if at least one of the first and second constituents is very reactive and is caused to be ignited by the conditions that arise during the step of penetrating. This then causes an energy release of the mentioned kind that causes the irreversible transition.

In accordance with an option, by the same process that causes the irreversible transition of the second constituent, an irreversible transition also of the first constituent is caused.

A first example of such a configuration with an irreversible transition of both constituents is if the first constituent is a green body, and the irreversible transition comprises firing the green body.

A second example of such a configuration is a configuration where the first constituent and the first constituent are subject to a chemical reaction as a result of which they are chemically bonded to each other. As an example, the first constituent may include a cellulose structure with cellulose fibers, and the second constituent may include polyacrylonitrile, and the product (the modified composite) after a heat treatment then is a carbon fiber composite (CFC).

The invention according to aspects thereof allows to interpenetrate a body of a first constituent by material and/or in a way that so far has not been possible.

In a group of examples, the second constituent having thermoplastic properties comprises, in addition to a matrix of a thermoplastic polymer-based material, a filler of different material, for example a metal. The irreversible transition may then primarily be a transition of the thermoplastic matrix, for example from a low (electrical/heat) conduction state into a high conduction state.

For the interpenetration of a first constituent by a thermoplastic second constituent, in accordance with the prior art mainly injection molding techniques have been used. However, in standard injection molding processes, the injected melt is at a higher temperature than the mold and the first constituent, and the injected melt starts solidifying from the interface to the mold/the first constituent inwards. Thus, the melt will have a tendency to freeze where in contact with the mold or the surface of the first constituent that would have to be penetrated. More in general, the fluidity will be lower at the interface to the mold/first constituent's surface than in an interior of the melt. This makes the penetration of structures that are very small and/or have a high aspect ratio difficult. In order to deal with this problem, one would have to perform the injection molding process with a very hot mold and under a very high melt pressure. This is firstly not economical and secondly not feasible for all molds, especially if the mold is not of a standard mold material but is a different work item of a material and dimension dictated by the specific purpose. In addition, the first constituent for this has to be inserted into a mold for the process to be possible, whereas in many embodiments of the invention this is not necessary, as the first constituent itself takes over the part of the mold cavities of which are filled.

Other prior art approaches comprise Chemical Vapor Deposition (CVD; CVD is restricted to the surfaces and not suited to fill structures with a high aspect ratio), and infiltration by slurries of powder (with very limited applications). Both procedures are limited by the complexity of their processes, e.g. CVD requiring long lasting high deposition processes under vacuum conditions, slurry infiltration suffering from very shrinkage or volume losses once transformed from liquid to solid by drying.

The invention according to aspects thereof, in contrast, proposes that the second constituent is provided and positioned relative to the first constituent as a solid. Both, pressure and temperature rise can then occur very locally at the interface to the first constituent, making an interpenetration of the structures by the second constituent much easier. Generally, if liquefaction of the initially solid second constituent takes place at the interface to the first constituent or close thereto, the fluidity will be particularly high close to this interface.

The invention can for example be used for the following applications or combinations thereof:
  mechanical reinforcement of porous material and/or reinforced mechanical connections between such porous material and a joining element anchored therein.
  making possible the contacting of (electrically not conducting) porous material in order to conduct electrical charges to and from the material, for example in catalysts, fuel cells, etc.; this includes selective contacting by electrical contacts electrically isolated from each other, as discussed hereinbefore;
  making possible the contacting of porous material in order to conduct heat to and from the material, for example if the porous material is a central element in a solar energy collector, heat exchanger, cooling element, etc.
  producing a deep (compared to the prior art) zone with interphase properties between a first and second constituent.

Especially if the irreversible transition is caused in a process in which the constituents are at least locally at an elevated temperature (a sintering temperature for example), there will not only be a deep (for example 1-10 mm deep) interpenetration zone, but also within the zone there will, during the process, be an enhanced diffusivity of atoms or molecules of the first and/or second constituent leading to an accordingly enhanced exchange on an atomic/molecular level. Thus, interphase effects, like an intermetallic phase at the boundary between the constituents or precipitation and/or accumulation of an element near the interface will take place throughout the interpenetration zone and not, as in the prior art, in a thin interface layer of a few atomic layers only. In embodiments in which a pore-to-pore distance is comparable to a range of the diffusion process at the heat treatment temperature (of the treatment which the irreversible transition is caused), then the interpenetration zone can be created as interdiffusion zone having essentially homogeneous properties, the depth of this zone corresponding approximately to the interpenetration depth. Effects brought about by the interphase properties or precipitation, like hardening, enhanced ductility, or other will thus be much more depth-effective than in the prior art that relies on surface effects only.

A first interesting class of (porous, first constituent) materials for which the method applies are sintered, i.e. powder based foams, for example ceramic foams.

Therein, in a first sub-class, the interpenetration can optionally already take place in the green body (before sintering).

In this case, the second constituent can itself be of a ceramic material that is, before sintering/firing, thermoplastic. Such materials exist, for example in the case of ceramic fillers embedded in a matrix of a thermoplastic polymer, e.g. known for parts being manufactured by CIM (ceramic powder injection molding).

Alternatively, the second constituent can be a material that after the sintering/firing exhibits metallic properties. For example, the second constituent may include metallic fillers in a matrix of a thermoplastic polymer. By this, an intimate connection between a ceramic constituent and a metallic constituent is achieved.

Applications may include connections that are designed for taking up mechanical loads, such as bearings.

Further applications may include connections with particular thermal properties, for example thermally insulating (second constituent itself becomes a ceramic) or thermally conducting (for example if second constituent is metallic).

Even further applications may include electrical connections, for example for conducting electrical charges to/from a surface of a ceramic body.

A ceramic foam or a green body can be solid and have some mechanical stability. However, the stability is not sufficient for a bushing to be anchored therein by a conventional method (press fit, screwing etc.). Also, injection molding is not an option in the presence of ceramic foam or a green body. The approach according to aspects of the invention, in contrast, provides a possibility of anchoring a bushing in a ceramic foam or according green body. Different uses of the bushing (with or without collar at the proximal end thereof) or the connection thereof to further parts are possible. All possibilities that exist for bushings are useable.

Further advantages of this first sub-class include an enhanced material exchange at the interface due to the remaining mobility in the green body, resulting in an extended and more intimate connection. The approach according to the invention in a green body as first constituent leads to a interfacial diffusion exchange during the firing or post-heat treatment process.

Also, the irreversible transition may cause a shrinkage of the second constituent. If the first constituent is a green body, the sintering/firing may also cause a shrinkage of the first constituent. By this, shrinkage effects can be compensated by appropriate choice of the material parameters and geometry. Moreover, this allows to deliberately introduce a desired stress distribution in the resulting modified composite. The shrinkage of the second constituent may be controlled by controlling the properties and filling level of a fillers in the second constituent; similarly, a shrinkage of the first constituent can be controlled by a density (for example if the first constituent is sintered during the irreversible transition), filling level or other property. For example, it is possible to deliberately cause a compressive stress that stabilizes a composite.

For example, if the second constituent is to be a ceramic (powder embedded in a polymer matrix), a powder density of the second constituent may be tailored for the second constituent to exhibit a certain, desired shrinkage behaviour in relation to the shrinkage behaviour of the green body that itself can be tailored by the green body powder density and composition. As a general rule of thumb, the constituent with the higher powder density will comprise a less pronounced shrinkage.

In a second sub-class, the first constituent includes a fired ceramic. In this second sub-group, the first constituent will not undergo a substantial transition after the interpenetration. Also in this second sub-group the second constituent may be chosen to include ceramic, metallic or other properties, and the applications include a same group of applications as for the first sub-class. Thus, the material of the second constituent may again be a ceramic material that is thermoplastic before sintering/firing, in which case there will be a second firing. Also other options exist, for example a thermoplastic material with a metallic filler, wherein the thermoplastic matrix material is carbonized after the interpenetration.

A second class of first constituent materials is graphite, for example graphite foam or carbon/carbon composite material. The above considerations, for the first class (second sub-class), about possible second constituent materials and their applications, also apply to graphite. Especially, the approach according to the invention allows to thermally, electrically or mechanically contact porous graphite. The material of the second constituent (or at least a thermoplastic matrix thereof) may be carbonized and if required graphitized after having been applied by the process according to aspects of the invention. An especially interesting application of this is for central bodies of solar energy collectors.

Among known solar energy plants there are plants that have mirrors or other light-directors directing the incident sunlight onto a central body from which heat is conducted away and used, for example, for generating electricity in a thermal power station. Therein, the central body may be subject to enormous and quick temperature changes, for example in case the sun is suddenly shadowed by a cloud. Therefore, the material of the central body should be capable of:

absorbing heat very well;
conducting heat very well;
having a high temperature resistance and temperature shock resistance;
having small thermal expansion; and
being mountable by means that conduct heat away very well.

All of these conditions except the last one are met by graphite, especially graphite foam.

The invention now provides approaches to also meet the last one by providing a method of mounting an element (namely the second constituent thermoplastic material or another element that is brought from a solid to a liquid state in which latter it interpenetrates the pores of the graphite foam and then re-solidifies so that it is anchored in the graphite foam) in graphite. Moreover, the mounting element may thereafter be modified, for example by being carbonized and graphitized, to become graphite-like itself (this may be in accordance with a known carbonization/graphitization process).

Accordingly, the invention according to a further aspect concerns a solar or other radiation energy collecting installation, the installation having a central body and at least one sunlight re-director, the sunlight re-director configured to direct incident sunlight onto the central body, wherein the central body comprises porous graphite and further has an element anchored therein, the element (this possibly includes at least one heat exchange tube or other element with a thermal interface coupling to the central body) having been fastened to the porous graphite by a method comprising the steps of providing an opening in the central body, providing a solid at least partly thermoplastic element, impinging the at least partly thermoplastic element with energy so as to cause it to liquefy at least partially, causing liquefied portions of the thermoplastic element to penetrate into pores of the central body in vicinity to the opening, to cause these portions to re-solidify, and to cause an irreversible transition at least of the liquefied, re-solidified portions of the thermoplastic element. Especially, this irreversible transition may be a carbonization.

It is possible to deliver the central body with a not yet carbonized second constituent and to ensure carbonization only upon irradiation by solar radiation.

A special material, especially interesting both, as material of the first constituent and of the second constituent is Silicone Carbide. Especially, SiC is, because of its high heat resistance, an interesting material for applications in thermal solar power industry.

A third class of first constituent materials are metals, namely metallic foams.

The second constituent material may then for example comprise a metallic filler. After the irreversible transition, the connection brought about by the process according to the invention is then for example a metal-metal transition. The interpenetration zone between the first and second constituents may be tuned to comprise interesting properties:

In a group of embodiments, the interpenetration zone may be tuned (by choosing the material compositions and a processing temperature, for example when the irreversible transition is caused) to be at a Eutectic composition or to exhibit properties of an intermetallic phase.

A polymer matrix of the second constituent will lead to an abundance of available elementary carbon and, depending on the chosen polymer, of elementary nitrogen. Also a matrix material containing phosphorus or other reactive elements that form the constituents of process induced precipitations may be used. This may be used to purposefully initiate heat induced diffusion that leads to hardening of the first constituent in and close to the interpenetration zone. In contrast to surface hardening techniques of the prior art, this is not restricted to a zone of a few nanometers but extends through the whole depth of the interpenetration zone.

Similarly, for example for semiconducting first constituents or fillers of the second constituent, a depth-effective doping can be achieved, for example by providing the thermoplastic polymer matrix by a chosen dopant material (such as N, P, C etc.). By this, a large-surface P—N-transition becomes achievable.

Similarly, solid state effects caused by different material pairings may be achieved, such as local variations of the electrochemical potential (sensor, charge generation, or charge separation—capacitors, with a large-area active interface, etc.)

A fourth class of first constituent materials is heterogeneous materials. In an example, the first constituent material may be 2-dimensional or 3-dimensional structure, for example textile structure, of fibers, especially of ceramic fibers, carbon fibers and/or metallic fibers. Such textile structures may constitute pre-fabricated products to be later provided with a matrix, such as a polymer matrix by resin infiltration, or metallic matrix by melt infiltration. Such preforms may, in accordance with approaches according to the invention, be provided with further elements (of the second constituent), such as for example a bushing, and electrical contact, a thermal contact, etc. Only after the interpenetration and possibly also only after the irreversible transition is then the first constituent provided with a matrix.

Referring to different kinds of first constituent materials, as an application, the second constituent may include and/or be provided with and/or be connected to a mounting and/or connecting means, for example a metallic bushing/tube or a SiC or graphite bushing that provides a junction between the porous material and a material without pores for a mechanical mounting, heat transition and/or electrical transition that is smooth and at the same time solid.

An even further application of methods according to aspects of the invention is the provision of a feed through that is instantaneously sealed against the interior of the porous material.

Turning, in general, to the second constituent materials, materials known from Powder Injection Molding (PIM) constitute an interesting class of materials also useable materials of the second constituent for embodiments of methods and devices according to the present invention.

A first sub-class of materials known from PIM are materials known for Ceramic Injection Molding (CIM), including Micro-Ceramic Injection Molding.

In this, Matrix materials (called 'binders' in CIM) may comprise different kinds of thermoplastic materials, including waxes, for example polyolefin waxes, polyoxymethylene (POM), polyethylene, polypropylene, polyamide, and polyvinylalcohol. Ceramic powders may be powders of any desired ceramics, for example the common $ZrO_2$, $Al_2O_3$, $TiO_2$ and mixtures of these with each other and/or with other oxides (Yttrium oxides, Hafnium Oxides etc.) as well as further ceramics known for various applications. Mean particle sizes may range between 0.1 μm and 5 μm, especially around 0.5 μm-2 μm. A teaching on materials (feedstocks) for CIM can be found in W. Bauer et al.: "Advanced Micro and Nanosystems, Vol. 3 (Microengineering of Metals and Ceramics), Chapter 12, pages 325-356, especially pages 328-333 and 345-347.

A second sub-class of materials known from PIM are materials known for Metal Injection Molding, as further discussed hereinafter.

An especially suited material for the thermoplastic matrix material portions is polyacrylonitrile. Further suitable materials comprise poly-(aromatic hydrocarbon) polymers, including polymers of polycyclic aromatic hydrocarbons. Examples are cellulose/saccharide based thermoplastic polymers. A teaching on criteria of polymer carbonization can be found in Y. N. Sanazov and A. V. Gribanov, Russian Journal of Applied Chemistry, 2009, Vol. 82, pp. 473-482 and the references mentioned therein.

In all aspects, in accordance with a first possibility, the energy is provided in the form of mechanical vibration (or, synonymously, oscillation). The mechanical vibration energy may especially be coupled into the second constituent from a sonotrode with an outcoupling face that is in contact with an incoupling face of the second constituent. The material of the second constituent may transmit the vibration energy to the interface with the first constituent where, due to friction, there is dominant energy absorption. By this, temperature of the second constituent is particularly high at the interface to the first constituent, and liquefaction starts from this interface.

In accordance with another possibility, the energy is provided in the form of radiation energy, for example laser radiation. The method for causing the necessary local heating for the desired liquefaction includes coupling electromagnetic radiation into one of the device parts to be anchored and designing one of the device parts to be capable of absorbing the electromagnetic radiation. Especially, the second constituent may be essentially transparent for the radiation, whereas for example the first constituent is not. The radiation will then be predominantly absorbed by the first constituent at the interface to the second constituent, by which effect the first and second constituents are heated very locally where the interpenetration is to occur, wherein such absorption preferably takes place within the anchoring material to be liquefied or in the immediate vicinity thereof. Preferably electromagnetic radiation in the visible or infrared frequency range is used, wherein the preferred radiation source is a corresponding laser.

Other sources of energy, for example mechanical rotation, or resistance heating, etc., are not excluded.

Mechanical vibration or oscillation suitable for devices and methods according to embodiments of the invention that include liquefaction of a polymer by friction heat created through the mechanical vibration has preferably a frequency between 2 and 200 kHz (even more preferably between 10 and 100 kHz, or between 20 and 40 kHz) and a vibration energy of 0.2 to 20 W per square millimeter of active surface. The vibrating element (tool, for example sonotrode) is e.g. designed such that its contact face oscillates predominantly in the direction of the element axis (longitudinal vibration) and with an amplitude of between 1 and 100 μm, preferably around 10 to 30 μm. Rotational or radial oscillation is possible also.

For specific embodiments of devices, it is possible also to use, instead of mechanical vibration, a rotational movement for creating the named friction heat needed for the liquefaction of the anchoring material. Such rotational movement has preferably a speed in the range of 10,000 to 100,000 rpm.

The thermoplastic materials being liquefiable described in this text may especially be liquefiable e.g. by mechanical vibration by comprising at least one thermoplastic component, which material becomes liquid or flowable when heated, in particular when heated through friction i.e. when arranged at one of a pair of surfaces (contact faces) being in contact with each other and vibrationally or rotationally moved relative to each other, wherein the frequency of the vibration is between 2 kHz and 200 kHz, preferably 20 to 40 kHz and the amplitude between 1 μm and 100 preferably around 10 to 30 μm. Such vibrations are e.g. produced by ultrasonic devices as e.g. known from ultrasonic welding. For applications in which mechanical vibration energy has to be transmitted within the second constituent over considerable distances, the second constituent material may have an elasticity coefficient of more than 0.5 GPa, preferably more than 1 GPa. (The material property values mentioned in this text generally refer to room temperature (23° C.) unless referring to temperatures or defined otherwise in this text).

However, for some applications, the thermoplastic material may also be substantially softer. Especially, if the liquefaction takes place directly at the interface between a tool and the second constituent, no mechanical energy has to be transmitted through the second constituent itself. Thus, during the process and thereafter (thus also generally at the temperature at which it is used, for example room temperature) it may be comparably soft, even to the point of being waxy. In other words, the advantages of an elasticity coefficient of at least 0.5 GPa do not apply or are at least not pronounced in these systems.

For applications in which liquefaction directly at an interface to a vibrating tool is an option, even elastomer materials for the second constituent thermoplastic material may be used.

Specific embodiments of matrix materials are: Polyetherketone (PEEK), Polyetherimide, Polyamide 12, Polyamide 11, Polyamide 6, Polyamide 66, Polycarbonate, Polymethylmethacrylate, Polyoxymethylene, or polycarbonateurethane. A material that is interesting for being carbonizeable to Graphite is Polyacrylonitrile.

Further embodiments, especially including ceramic fillers, are the above-mentioned materials that are known to be suited for (Micro-) Ceramic Injection Molding (CIM).

Even further embodiments are the thermoplastic materials known to be suited for carbonization/graphitization, as for example mentioned above.

Yet another category of materials are the materials known to be suited for Micro-Injection-Molding (MIM). A teaching on materials for MIM can be found in R. Ruprecht et al.: "Advanced Micro and Nanosystems, Vol. 3 (Microengineering of Metals and Ceramics), Chapter 10, pages 253-287, especially pages 271-272.

An even further category of materials are the materials that have metallic fillers and that are known to be suitable for (Micro-) Metal Injection Molding (MIM). These include a thermoplastic matrix, for example of polyoxymethylene (POM), polyethylene (PE), polypropylene (PP), polyamide (PA), poly(vinylalcohol) (PVA) or modified versions of these components. The fillers may be powders of metals such as stainless steel, iron, alloys (prealloyed or in an external mixture with alloying powders) or other suitable materials. The particle sizes are often in the range between 0.5 μm and for example 20 μm, especially 1-10 μm. A teaching on materials (feedstocks) for MIM can be found in V. Piotter et al.: "Advanced Micro and Nanosystems, Vol. 3 (Microengineering of Metals and Ceramics), Chapter 11, pages 289-324, especially pages 293-301.

A material that is especially suited as matrix material filled by a (for example ceramic or metallic) filler is a polyolefin.

In the case of a thermoplastic matrix material, the processes according to aspects of the invention may be used even if the filler material makes up as much as up to 80% or 85% (Vol.-%) of the material, of the second constituent, having thermoplastic properties, which makes the processes suitable also for materials for which injection molding is not possible. Despite high filling grades, the material remains well capable of flowing, because of favorable flow conditions, e.g. the short flow distance, low flow aspect ratio, low flow velocities as well as because of the missing flow obstacles, missing high aspect ratio channels, or missing flowability requirements in the extruder as in injection molding. In injection molding, further obstacles are, for example, presented by gates or the like.

If the liquefiable material is to be liquefied not with the aid of vibrational energy but with the aid of electromagnetic radiation, it may locally contain compounds (particulate or molecular) which are capable of absorbing radiation of a specific frequency range (in particular of the visible or infrared frequency range), e.g. calcium phosphates, calcium carbonates, sodium phosphates, titanium oxide, mica, saturated fatty acids, polysaccharides, glucose or mixtures thereof.

The material of the tool (for example sonotrode) and/or the material of the auxiliary element may be any material that does not melt at the melting temperatures of the liquefiable material. Especially, the tool and/or the auxiliary element may be of a metal, for example a titanium alloy. A preferred material is titanium grade 5. This material, in addition to being generally suited for anchorable devices, has a comparably low heat conduction. Because of this poor heat conduction, the melting zone arising in liquefiable material and at the interface to the directing structure is heated quickly, without the surroundings being heated to too high temperatures. Alternative materials for the tool and/or the auxiliary element are other metals like other titanium alloys, stainless steel and low damping, temperature and abrasion resistant Fe, Ni or Co-base alloys, ceramics like Zirconium oxides or Aluminum oxides, Siliconnitrides or Siliconcarbides, or hard plastics such as PEEK etc. To optimize abrasion resistance towards damping behavior and toughness, parts of the tools that interact directly with abrasive, i.e. highly ceramic or metal powder filled thermoplastics, can be made of ceramics. Possibly but not necessarily in combination with this, the elongated sonotrode shaft can be made of a minimally damping metal alloy or amorphous metal (metal glass).

BRIEF DESCRIPTION OF THE DRAWINGS

In the following, ways to carry out the invention and embodiments are described referring to drawings. The drawings mostly are schematic. In the drawings, same reference numerals refer to same or analogous elements. The drawings show:

FIGS. 1a-1d steps in a process of manufacturing a heterogeneous composite;

FIG. 2 a second constituent;

FIGS. 8a-9b schemes representing a transition between adjacent constituents according to the prior art and according to approaches in accordance with the invention;

FIG. 10 a solar energy plant; and

DESCRIPTION OF THE PREFERRED EMBODIMENTS

Figure 3:
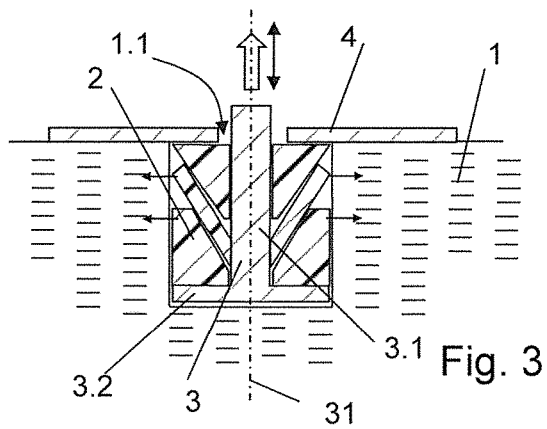
FIGS. 3-7 alternative configurations for causing interpenetration of a first constituent by material of a second constituent.

FIG. 1a depicts a first constituent 1 of a material having pores or of a material in which pores can be made under hydrostatic pressure. A second constituent 2 is in the depicted example provided as a pin-shaped thermoplastic element. As illustrated in FIG. 1b, for the process, the second constituent is placed relative to the first constituent. In the depicted configuration, the first constituent comprises a bore into which the second constituent is introduced.

Thereafter, by an appropriate tool 3, energy is coupled into the second constituent. The tool 3 may, for example, be a sonotrode. By the impact of the energy, the thermoplastic material is at least locally melted where in contact with the first constituent, so that under the pressure acting from the tool—that is pressed in the direction illustrated by the double arrows in FIG. 1b, the thermoplastic material interpenetrates the first constituent material. FIG. 1c very schematically illustrates the arrangement after the energy impact has stopped and after the thermoplastic material has re-solidified.

The process parameters of the step of causing the interpenetration of the first constituent by material of the second constituent may, for example, be chosen similar to the process described in WO 98/42988 or the process described in WO 00/79137.

The interpenetration of the first constituent by the thermoplastic material leads to a mixing zone 11 that includes a heterogeneous mixture of first constituent material and the thermoplastic material. The depth of the mixing zone 11 depends on the properties of the first constituent and on the pressure applied during the interpenetration process. Typically, the depth d of the mixing zone will be of the order of 1 mm-10 mm—for open porous first constituent materials with large pores it can also be larger.

After re-solidification of the thermoplastic material, the composite as shown in FIG. 1c is subject to a treatment that causes the irreversible transition. For example, the process may include heating to a high temperature—such as a firing process. By this, the thermoplastic material may be caused to undergo a transition, for example by being charred/pyrolized or completely burnt. This may cause a shrinkage of the second constituent. At the same time, optionally also the first constituent may undergo an irreversible transition. In an example, the first constituent is initially a green body that is fired in the process. In another example, the first constituent may include a foam of a meltable material, such as a metallic foam. Also the first constituent may undergo a shrinkage process. If the material parameters of the first and second constituents are chosen so that the shrinkage of the second constituent is over-compensated by the shrinkage of the first constituent, this may cause a compressive stress on the composite, thus stabilizing the composite mechanically. More in general, materials and geometries may be chosen so that same or different shrinkages may cause a desired stress distribution and final dimension.

In FIG. 1d, the resulting composite is illustrated after the irreversible transition. It is assumed, that the first constituent 1 has undergone a transition—for example sintering—that has caused it to shrink. The arrows indicate the compressive stress on the composite.

The second constituent 2 is illustrated to have metallic properties after the transition. This may, for example, be brought about by the second constituent being of a metallic filler embedded in a polymer matrix, wherein the polymer matrix is burnt/carbonized in the irreversible transition process.

Thus, the illustrated embodiment results in a connection between a for example ceramic first constituent 1 with an ultimately metallic second constituent, which connection involves interpenetration of the first constituent by the second constituent with an interpenetration zone 11 having depth of between about 1 mm and about 10 mm; so far this was not readily possible.

As schematically illustrated in FIG. 2, it is not necessary that the second constituent 2 consists of the material having, at least prior to the irreversible transition, thermoplastic properties. Rather, the second constituent may be a hybrid. In FIG. 2, the second constituent is illustrated to include a core 2 for example of a metallic or ceramic or plastic (but not thermoplastic or thermoplastic with a much higher melting temperature) core 21 and a coating 22 and a coating of the material with the thermoplastic properties. In order to be suitable for the process, the second constituent needs thermoplastic material that is in contact or can be brought in contact with the first constituent when it is liquefied.

Figure 4:
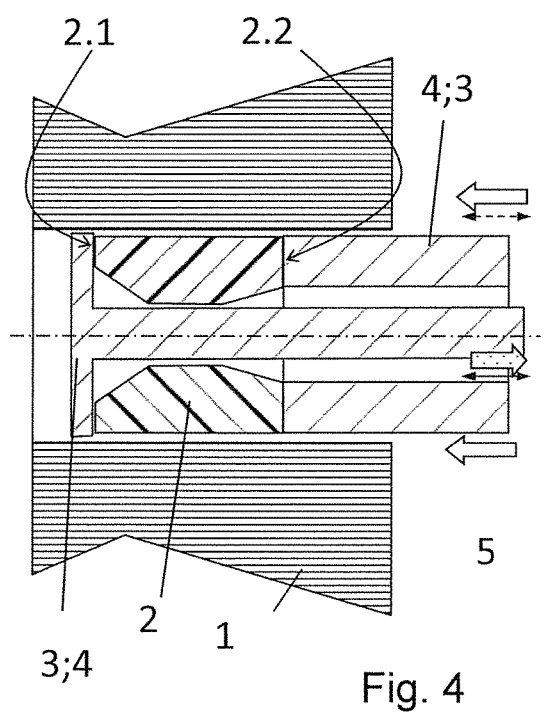

FIGS. 3 and 4 yet show variants of the interpenetration step, both with mechanical vibration energy. In both variants, in contrast to the above-taught embodiment the second constituent is not directly pressed against the first constituent in the process, but pressure is applied onto the second constituent between the tool 3 (the sonotrode) and a counter element 4. By this, the process is applicable also in situations where the first constituent is not suitable to take up a high mechanical load.

The tool 3 in FIG. 3 is depicted to have a shaft portion 3.1 and a foot portion 3.2. The shaft portion reaches through the second constituent, and the foot portion (a distally facing outcoupling face thereof) is in contact with a distal end of the second constituent 2, so that the vibrations can be coupled into the second constituent from a rearward end thereof.

In the variant of FIG. 3, the second constituent 2 due to its construction—it has a plurality of elements that are spreadable and can shift along surfaces that are conical/oblique to an axis 31—a compression of the second constituent between the tool 3 and the counter element 4 causes the second constituent to laterally expand and to be pressed against lateral walls of an opening 1.1 in the first constituent. By this, when vibrations are coupled into the arrangement, friction between the first and second constituents may cause or at least assist liquefaction of the thermoplastic material.

In the variant of FIG. 4, in contrast, the first constituent 1 need not be loaded at all by directed pressure. Rather, liquefaction will take place at an interface/at interfaces between one or both of the end faces 2.1, 2.2 and the tool 3 and the counter element 4, respectively. Note that in the configuration of FIG. 4, the roles of the tool 3 and the counter element 4 can be reversed, i.e. in a sub-variant, the element reaching through the second constituent 2 and having a distal foot can serve as counter element, whereas the tube-shaped element in contact with the proximal end face of the second constituent can be coupled to a vibration source and serve as a sonotrode.

Figure 5:
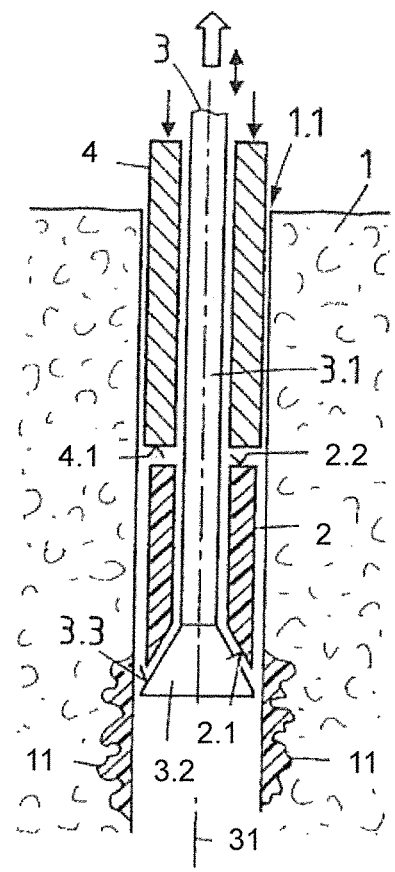

FIG. 5 yet shows a configuration comparable to the one of FIG. 4. The tool has a shaft portion 3.1 and a distal foot portion 3.2 with an outcoupling surface 3.3, liquefaction taking place at a first interface between the outcoupling surface and an incoupling surface 2.1 of the second constituent. The proximal end face 2.2 of the second constituent 2 is, during the process, pressed against a second interface with the distal end face 4.1 of the counter element 4. During the process, this second interface may be held still or may be moved distally or proximally.

At the liquefaction interface (the first interface) a full cross section of second constituent is liquefied. For example, an outer diameter of the tool (at least in the region of the liquefaction interface, thus in rearward configurations the outer diameter of the foot portion 3.2) may be chosen to approximately correspond to the inner diameter of the initial opening 1.1 (for example, to be equal or smaller by at most 10% or at most 5% or at most 3%) and/or to be (approximately) equal to or greater than the outer diameter of the second constituent (for example, to correspond to it, or to be larger, or to be smaller by at most 7%, at most 4%, or at most 2%). Especially, the liquefaction may be carried out so that no portion of the second constituent that was not liquefied at the liquefaction interface(s) remains in the object or connected thereto after removal of the tool 3.

Thus, the configuration of FIG. 5 is an example of a configuration where the interpenetration leads to a reinforcement and/or lining of the first constituent by material of the second constituent. Especially, the reinforcement and/or lining may concern the walls of an opening of the first constituent.

A large variety of approaches for reinforcement and/or lining of a constituent by thermoplastic material is described in PCT/CH2013/000102 by the same applicant as the present application, incorporated herein by reference in its entirety.

All of the examples depicted in FIGS. 3-5 are examples suitable for configurations where the force that ultimately causes the hydrostatic pressure is coupled into the tool 3 that transmits the energy as a tensile force (pulling force).

Figure 6:
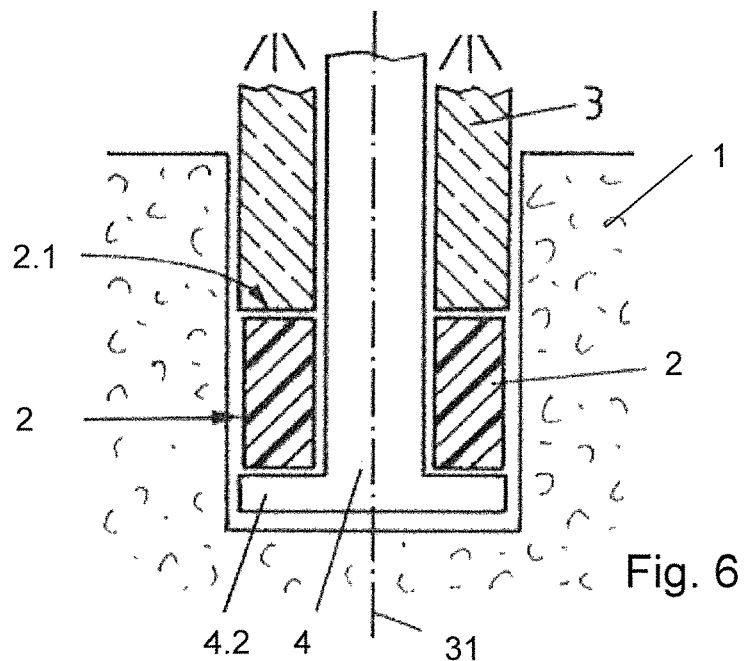

FIG. 6 yet shows a variant, where the energy used for the interpenetration is not mechanical energy but radiation energy. To this end, the tool 3 is provided as a light guide. The radiation energy may for example be absorbed at the proximal end face 2.1 of the second constituent, within the second constituent 2, or, if the second constituent is sufficiently transparent, at the interface to the foot portion 4.2 of the counter element 4.

Figure 7:
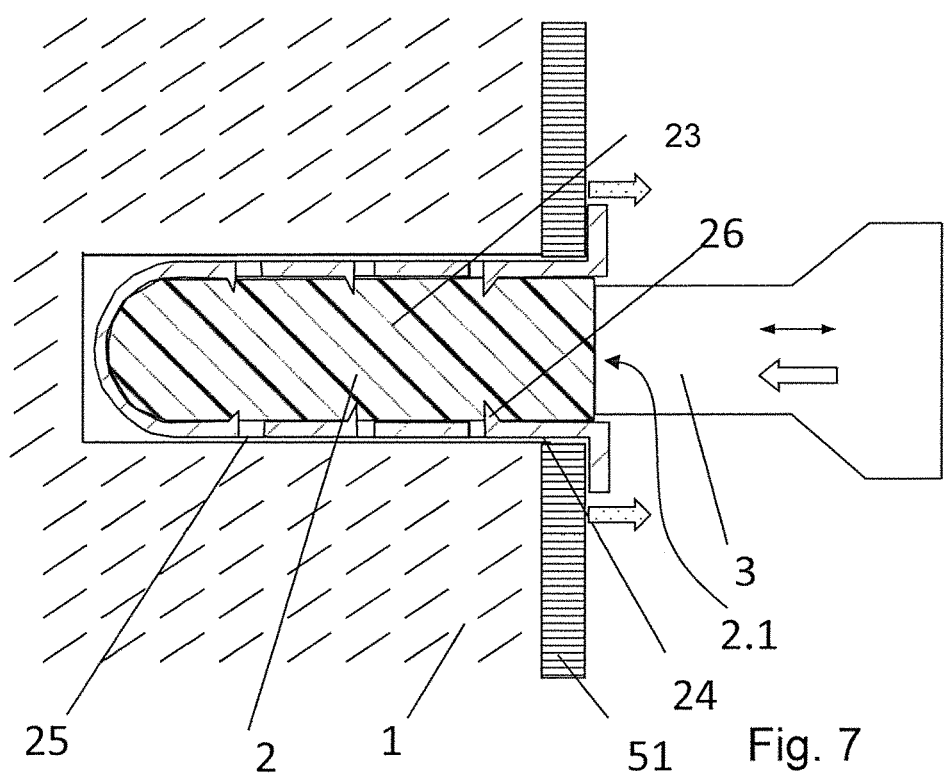

In the variant of FIG. 7, the second constituent 2 includes a sheath element 24 of a non-thermoplastic material (or thermoplastic material liquefiable at a much higher temperature) with a plurality of openings 25 and a thermoplastic element 23 inserted or insertable into the sheath element. During the process, the energy is coupled into the thermoplastic element until material of the thermoplastic element is liquefied and pressed out of the openings 25. In FIG. 7, also an optional reinforcement layer 51 that takes up mechanical load arising during the pressing is illustrated.

Like for the embodiment of FIG. 1*a*-1*d*, for all of the configurations of FIGS. 2-7, the irreversible transition will take place after the interpenetration by the thermoplastic material and the re-solidification or possibly simultaneously therewith.

FIG. 8*a* illustrates a first constituent 1 of connected to a second constituent 2 in accordance with a prior art approach. The first and second constituents are assumed to have different densities and different physical properties. For example, the second constituent may have been brought into contact with a surface of the first constituent in a liquid state and then cooled (cast). Because of the relatively abrupt transition at the common interface, a physical quantity Q will change as a function of the position in a step-like manner as illustrated in FIG. 8*b*. The derivative of this function with respect to the position will thus comprise a very high peak at the interface. Therefore, quantities like temperature-change-induces stress (or example if the quantity Q is the coefficient of thermal expansion) may tend to be very large at the interface and thus have unfavorable influences. Similar considerations apply to other sensitive quantities.

If the approach according to the invention is chosen instead, as illustrated in FIG. 9*a* there will be a considerable interpenetration zone 11. Therefore, the average value of the quantity Q can change more continuously (FIG. 9*b*), and thus phenomena like stress at the interface are substantially reduced.

FIG. 10 shows a solar or energy collecting installation. A central body 101 includes porous graphite and is thus an excellent heat absorber. A plurality of mounting and heat conducting elements 102 are fastened to the central body. The elements each include a heat conducting core (the core may have a passive heat conductor or means for conducting a fluid) and a carbonized, originally thermoplastic material interpenetrating the central body 101. The installation further includes a plurality of sunlight re-directors 104 (actively tilting mirrors) that direct incident sunlight 105 onto the central body. Reference number 103 denotes a device by which the collected heat is directed to an exploiting stage, for example including a turbine for producing, together with a generator, electricity.

Figure 11:
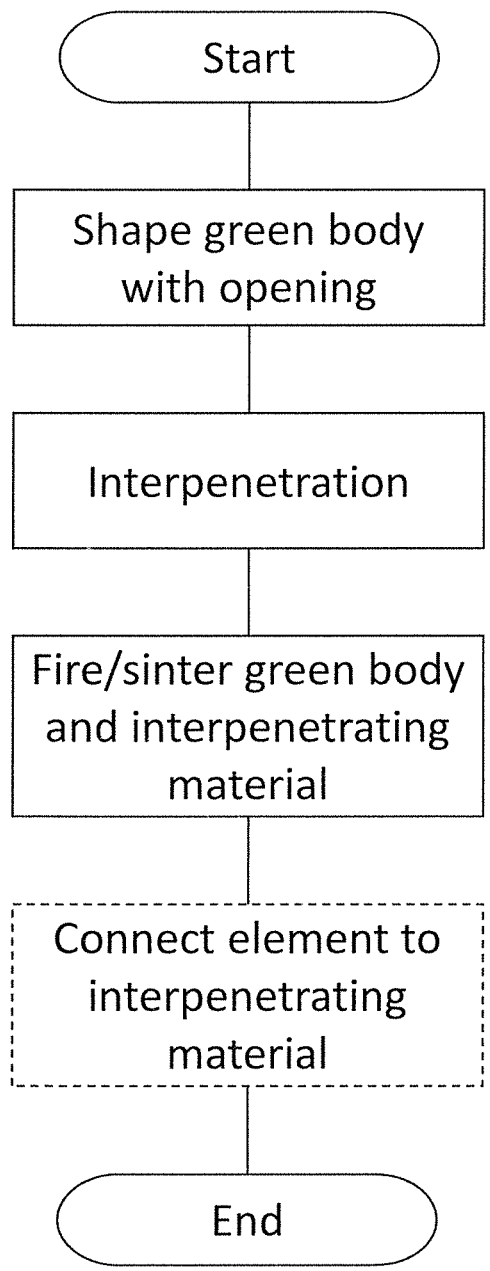
FIG. 11 a flowchart.

The flowchart shown in FIG. 11 illustrates the manufacturing of a ceramic foam with an opening that is lined and/or reinforced by a process as described herein. For example, the ceramic foam may be the body of a fuel cell from which or to which electrical charges have to be transported and which thus needs to be electrically contacted, or a ceramic foam for any other application, for example an application discussed hereinbefore.

The process includes lining/reinforcing the initial opening by causing the interpenetration of thermoplastic material, for example as shown in FIG. 6, while first constituent that is made of the ceramic foam is still a green body prior to firing/sintering the green body. For example, the green body may directly be shaped (molded or similar) with the initial opening, whereafter the opening is lined and/or reinforced.

Because in embodiments of the invention, during the liquefaction no pressure is exerted on the object except the small pressure of the liquid that penetrates into the pores, the small dimensional stability of the green body is sufficient for this.

After the step of interpenetrating, the green body is fired and/or sintered. Because of this, the interpenetrating material of the second constituent has to be chosen to sustain the temperature during this process. In the depicted embodiment, the second constituent material is chosen to be itself a ceramic material that is thermoplastic before hardening. Then, in the firing/sintering process second constituent material is simultaneously sintered to ceramic material also.

After the firing/sintering process, the reinforcement/lining may be used for connecting a further element (joining element/electrical contact, heat conductor etc.) to the ceramic body.

What is claimed is:

1. A method of manufacturing a heterogeneous composite, the method comprising the steps of:
    providing a first constituent and a second constituent, wherein the first constituent is porous or capable of developing pores when under hydrostatic pressure, and the second constituent comprises a solid having thermoplastic properties;
    positioning the second constituent adjacent to the first constituent;
    coupling energy into the second constituent to cause at least portions of the second constituent to liquefy and to penetrate into pores or other structures of the first constituent, whereby the first constituent is interpenetrated by material of the second constituent to yield a composite comprising the first constituent, the second constituent, and an interpenetration zone between the first and second constituents; and
    providing an irreversible transition at least of the second constituent to yield a modified composite, wherein the irreversible transition comprises a chemical reaction taking place within the second constituent or between the first and second constituents.

2. The method according to claim 1, wherein the irreversible transition is provided by energy input on the composite.

3. The method according to claim 2, wherein the energy input comprises a heat treatment of the composite.

4. The method according to claim 1, wherein the irreversible transition comprises diffusion of material of the first constituent into the second constituent and/or vice versa.

5. The method according to claim 1, wherein by a same process that provides the irreversible transition of the second constituent, an irreversible transition also of the first constituent is provided.

6. The method according to claim 1, wherein the first constituent comprises a green body, and wherein the method comprises a step of firing the green body after interpenetration of the first constituent by material of the second constituent.

7. The method according to claim 6, wherein the irreversible transition is provided by the step of firing.

8. The method according to claim 1, wherein the step of coupling energy into the second constituent comprises coupling mechanical vibration into the second constituent.

9. The method according to claim 8, wherein during the step of coupling energy into the second constituent, the second constituent is clamped between a vibrating tool and a counter element, the counter element being different from the first constituent.

10. The method according to claim 9, wherein the energy coupled into the second constituent causes liquefaction of the solid having thermoplastic properties at an interface between the second constituent and the vibrating tool, and wherein a clamping force causes the liquefied thermoplastic material to be displaced from between the second constituent and the vibrating tool into structures of the first constituent.

11. The method according to claim 9, further comprising a step of removing the vibrating tool, wherein after the step of removing no portion of the second constituent that was not liquefied remains in the object or connected thereto.

12. The method according to claim 8, wherein the mechanical vibration is coupled into the second constituent by a tool on which a tensile force acts during the step of coupling.

13. The method according to claim 1, wherein the second constituent comprises a core of a material having non-thermoplastic properties not or of a material liquefiable at temperatures that are higher than a melting temperature of the solid having thermoplastic properties.

14. The method according to claim 1, wherein the solid having thermoplastic properties comprises a matrix of a thermoplastic polymer and a metallic filler.

15. The method according to claim 1, wherein the solid having thermoplastic properties comprises a matrix of a thermoplastic polymer and a ceramic filler.

16. The method according to claim 15, wherein the ceramic filler is green.

17. The method according to claim 15, wherein the ceramic filler is fired.

18. The method according to claim 1, wherein the first constituent comprises a ceramic.

19. The method according to claim 1, wherein the first constituent comprises a metallic foam.

20. The method according to claim 1, wherein the first constituent comprises graphite foam.

21. The method according to claim 1, wherein the step of coupling energy into the second constituent is carried out until an interpenetration zone having a depth of at least 1 mm results.

* * * * *